Aug. 18, 1942.　　G. E. HALLENBECK　　2,293,134
SLIDEWAY CONSTRUCTION FOR MACHINE TOOLS
Filed Jan. 8, 1940　　2 Sheets-Sheet 1
FIG.1.
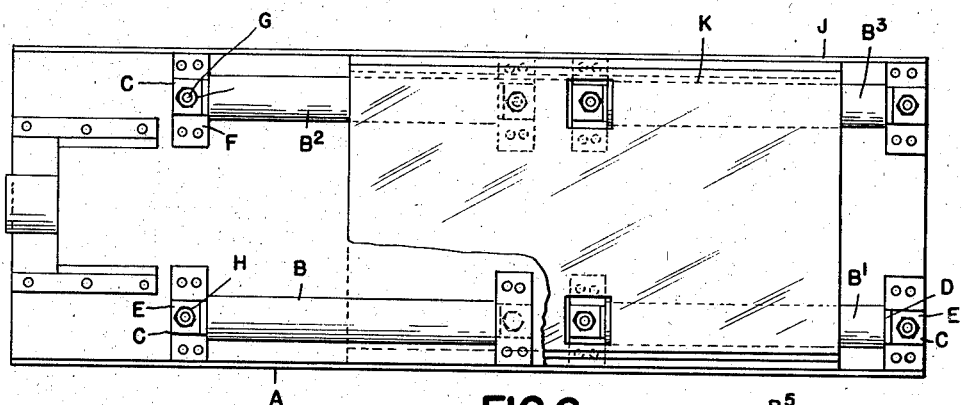
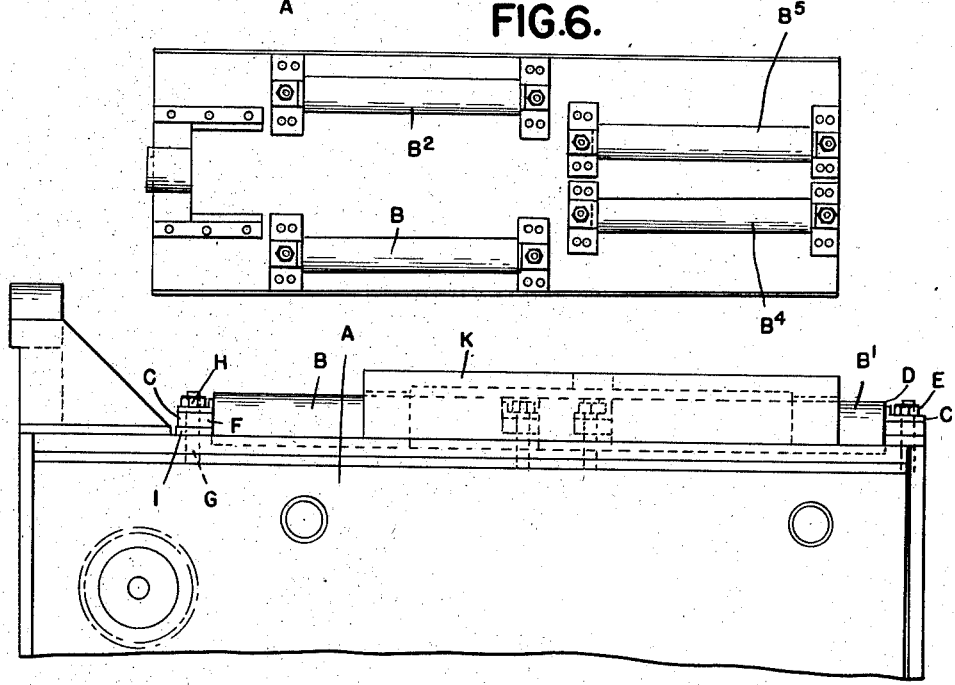
FIG.6.
FIG.2.
INVENTOR.
GEORGE E. HALLENBECK
BY *Whittemore Hulbert Belknap*
ATTORNEYS Aug. 18, 1942.  G. E. HALLENBECK  2,293,134
SLIDEWAY CONSTRUCTION FOR MACHINE TOOLS
Filed Jan. 8, 1940  2 Sheets-Sheet 2
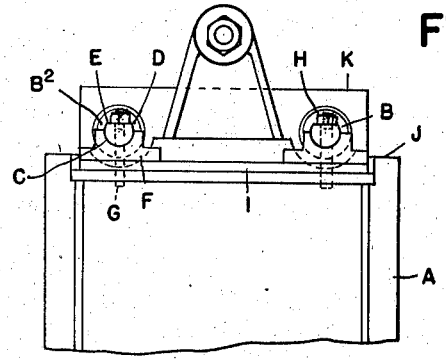
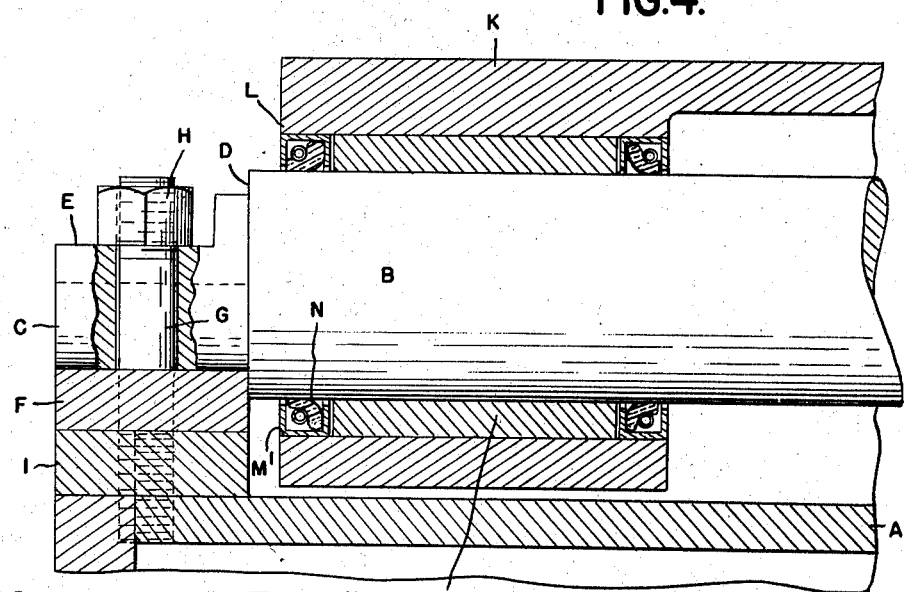
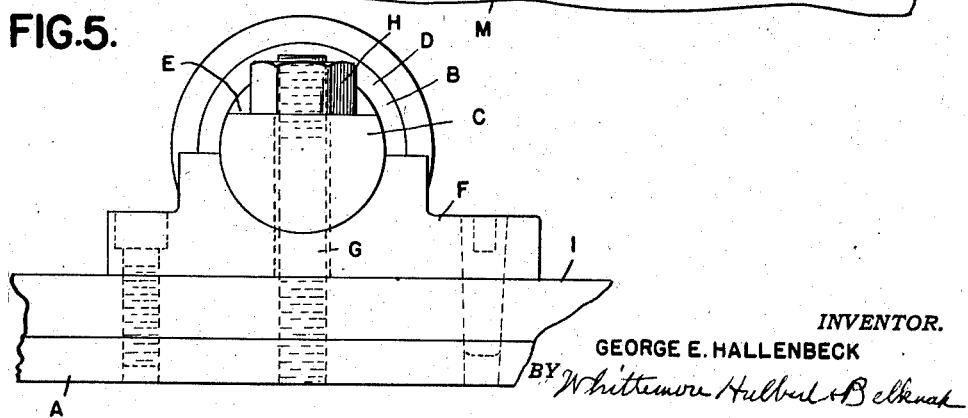
INVENTOR.
GEORGE E. HALLENBECK
ATTORNEYS

UNITED STATES PATENT OFFICE 2,293,134

SLIDEWAY CONSTRUCTION FOR MACHINE TOOLS

George E. Hallenbeck, Toledo, Ohio, assignor to Baker Brothers, Inc., Toledo, Ohio, a corporation of Ohio Application January 8, 1940, Serial No. 312,997

8 Claims. (Cl. 308—3)

The invention relates to slideways designed for the mounting of carriages on machine tools and for other similar purposes. It is the object of the invention to obtain a construction which facilitates the mounting of the way or ways on the supporting bed so as to obtain great accuracy in alignment. It is a further object to obtain various advantages as more fully hereinafter set forth.

In the drawings:

Figure 1 is a plan view of a portion of the bed of a machine tool showing my improved slideways mounted thereon;

Figure 2 is a side elevation;

Figure 3 is an end elevation;

Figure 4 is an enlarged longitudinal section through one of the ways and its securing bracket;

Figure 5 is an enlarged elevation of a portion of Figure 3;

Figure 6 is a view similar to Figure 1, showing a slightly modified construction.

As illustrated, A is the bed of a machine tool upon which a traveling carriage is to be supported. In the earlier art it was customary to form slideways for the carriage integral with the bed and usually of a V-shaped or rectangular cross section. Such construction being formed of comparatively soft metal was subject to rapid wear and soon lost its accuracy. To overcome this defect slideways have been formed of separate hardened members mounted on the bed, but with these further difficulties have been experienced, such as the difficulty of obtaining the required degree of rigidity and accuracy of alignment, and the avoidance of interference with other parts of the mechanism. With my improved construction the ways are formed of cylindrical rods, the opposite ends of which engage supporting bracket bearings secured to the bed. Each rod supports but a single and comparatively short slide bearing of the carriage, the other bearings thereof being supported by additional rods in axial alignment and in parallel relation to the first. Thus, the length of each rod is limited to that required for the movement of the carriage plus the length of the slide bearing, instead of the full length of the carriage plus the length of travel thereof. Inasmuch as the rigidity of a member is inversely proportional to the length thereof between supports, it is obvious that the first mentioned construction has an advantage over the second.

In detail, B are the cylindrical rods formed of hardened metal. Each of these rods has end portions C slightly reduced in diameter to form a shoulder D between the same and the body of the rod. Also, the upper part of the portion C is cut away to form a flat face E. F are bracket bearings having semi-cylindrical sockets for engaging the portions C and with flat bottom faces for engaging bearings on the bed. Securing studs G pass through aligned apertures in the portion C, bearings F, and bed, and nuts H having a threaded engagement with said studs bear against the flat faces E and hold the rods in rigid relation to the bed. These nuts H are of dimensions which fall within the circle of the body of the rod B so as to form no obstruction to either end of said rod, thereby permitting the axes of the several rods to be brought into a common plane determined by means of a surface plate laid on the rods before mounting the carriage or traveling member thereon. The brackets F are seated upon bosses I projecting upward from the bed and machined to present top surfaces all in the same plane.

In assembling the structure, one of the rods B is mounted on the bed with the bracket bearings F engaging the reduced portions C at the opposite ends of the rod, and said bearings resting upon the registering bosses on the bed, the rod being positioned to be parallel to a longitudinally extending flange J at the side of the bed. A second rod B' is then placed in alignment with the rod B, this alignment being secured by the use of a surface plate or straight edge extending longitudinally along the sides of both rods. The remaining rods B² and B³ are then positioned to be parallel respectively to the rods B and B'. The fact that the securing studs G and nuts H do not project beyond the periphery of the body of the rod avoids any obstruction to the use of the surface plate or straight edge.

After the slideways have been properly positioned to be in alignment, the carriage may be readily mounted thereon as follows. The carriage K is provided with depending portions L, which are apertured for the passage of the rods B and are provided with hardened bushings M for closely fitting the rods. These bushings are slightly shorter than the portion L to leave recesses M' at opposite ends and an oil sealing means N is located in each recess. This not only retains the oil which is introduced between said sealing means, but also excludes the entrance of chips or dust.

With the construction as above described, a high degree of rigidity in the rods is obtained by reason of the fact that the length of each rod is relatively short with respect to its diameter, This is possible due to the fact that but a single bearing engages each rod so that the length of the rod need only be the length of travel of the carriage plus the length of the bearing.

Instead of having the successive rods in axial alignment with each other, as shown in Figure 1, they may, if desired, be laterally offset, but in parallel relation to each other. Such a construction is represented in Figure 6 in which the rods B⁴ and B⁵ are inwardly offset from the rods B and B², but are tangent to a common horizontal plane.

What I claim as my invention is:

1. The combination with a supporting bed or frame, of a slideway mounted thereon and spaced therefrom comprising a cylindrical rod having an end portion reduced in diameter to form a shoulder between the same and the body of the rod, said reduced portion being also cut away in its upper portion, a bracket bearing having a segmental bearing portion fitting said reduced end portion and of an external width less than the diameter of said cylindrical rod, said bracket bearing also having a flat face engaging said bed or frame, and a securing member having a shank portion passing through aligned apertures in said reduced end portion of the rod, bracket bearing and bed, and also having a head portion located in the cut away portion so as to be together with said bracket bearing portion wholly within the projection of the body of the rod.

2. The combination with a supporting bed or frame, of a slideway mounted thereon and spaced therefrom comprising a hardened cylindrical rod having opposite end portions reduced in diameter to form shoulders between the same and the body of the rod, the upper portions of said reduced ends being also cut away, bracket bearings having segmental portions engaging said reduced end bearing portions adjacent to said shoulders and of an external width less than the diameter of said cylindrical rod, said bracket bearings also having flat surfaces for engaging said bed or frame and securing members each having a shank passing through aligned apertures in said reduced end portions, bracket bearings and bed, and a head located in said cut away portion to be together with said bracket bearing portions wholly within the projection of the periphery of the body portion of said rod.

3. The combination with a supporting bed or frame, of a slideway mounted on said bed and spaced therefrom comprising a pair of parallel cylindrical rods each having opposite end portions reduced in diameter to form a shoulder between the same and the body portion of the rod and being also cut away in their upper portions, bracket bearings having segmental bearing portions engaging said reduced end portions adjacent to said shoulders of an external width less than the diameter of said cylindrical rod and flat portions engaging said bed or frame, and fastening means for said rods including shank portions extending through aligned apertures in said reduced end portions, bearings and bed, and heads located in said cut away portions to be wholly within the projection of the periphery of the body portions of said rods.

4. The combination with a supporting bed or frame, of a slideway mounted thereon and spaced therefrom comprising a plurality of cylindrical rods, bearings for supporting the opposite ends of said rods on said bed or frame, and securing means therefor engageable from the top thereof, said bearings and securing means being located beneath a plane tangent to the upper surfaces of said rods so as to form no obstruction in said plane at or beyond either end of said rods.

5. The combination with a supporting bed or frame, of a slideway mounted thereon and spaced therefrom comprising a series of cylindrical rods, each rod being supported at its opposite ends only and being of a length limited in proportion to its diameter so as to obtain a high degree of rigidity therein, a carriage for traveling on said slideway overlapping a plurality of said rods, and a plurality of spaced bearings for supporting said carriage on said rods there being but a single bearing for engaging each rod which is restricted in length to a small fraction of the length of the rod, and the length of said rod being substantially equal to the length of said bearing plus the maximum length of travel of the carriage.

6. The combination with a supporting bed or frame, of a slideway mounted thereon and spaced therefrom comprising a plurality of parallelly arranged cylindrical rods each rod being of a length limited in proportion to its diameter to secure a high degree of rigidity therein, bearings engaging opposite ends of said rods for supporting the same on said bed or frame, and securing means therefor engageable from the top, said bearings and securing means being located wholly beneath a plane tangent to the upper surfaces of said rods so as to form no obstruction in said plane at or beyond either end of said rods.

7. The combination with a supporting bed or frame, of a slideway mounted thereon and spaced therefrom comprising a plurality of separate cylindrical rods, each rod being supported at its opposite ends only and proportioned in diameter to length to obtain a high degree of rigidity, a carriage for traveling on said slideway overlapping said rods and provided with spaced bearings sleeved about the rods, there being but a single bearing in engagement with each rod, and the length of each rod being limited to the length of the bearing plus the maximum length of movement of the carriage.

8. The combination with a supporting bed or frame, of a slideway mounted thereon and spaced therefrom, comprising a plurality of separate cylindrical rods, securing means for the opposite ends of said rod confined within the space limits of the projection of the body of the rod at the opposite sides and top thereof, each rod being proportioned in diameter to length to obtain a high degree of rigidity, a carriage for traveling on said slideway overlapping said rods and provided with spaced bearings sleeved about the rods, there being but a single bearing in engagement with each rod, and the length of the rod being limited to the length of the bearing plus the maximum length of travel of said carriage.

GEORGE E. HALLENBECK.